US011994987B2

(12) United States Patent
Ng et al.

(10) Patent No.: US 11,994,987 B2
(45) Date of Patent: May 28, 2024

(54) NFT SYSTEMS, METHODS, AND STRUCTURES FOR MULTIPLATFORM GAMING CONTENT

(71) Applicant: Monsoon Digital PTE LTD., Singapore (SG)

(72) Inventors: Chern Ann Ng, Singapore (SG); Carlos Pajares Bernardez, Bangkok (TH)

(73) Assignee: Monsoon Digital PTE LTD., Singapore (SG)

( * ) Notice: Subject to any disclaimer, the term of this patent is extended or adjusted under 35 U.S.C. 154(b) by 3 days.

(21) Appl. No.: 17/991,382

(22) Filed: Nov. 21, 2022

(65) Prior Publication Data
US 2023/0161699 A1 May 25, 2023

Related U.S. Application Data

(60) Provisional application No. 63/399,092, filed on Aug. 18, 2022, provisional application No. 63/266,247, (Continued)

(51) Int. Cl.
*G06F 12/02* (2006.01)
*G06F 16/182* (2019.01)

(52) U.S. Cl.
CPC ........ *G06F 12/0292* (2013.01); *G06F 16/182* (2019.01)

(58) Field of Classification Search
None
See application file for complete search history.

(56) References Cited

U.S. PATENT DOCUMENTS

| 7,536,398 | B2 | 5/2009 | Moog |
| 10,861,095 | B1 | 12/2020 | Koch et al. |

(Continued)

FOREIGN PATENT DOCUMENTS

| CN | 113159734 A | 7/2021 |
| KR | 10-2021-0127132 | 10/2021 |

OTHER PUBLICATIONS

So & Sato Innovative Lawyers, Buyer Beware—Digital Art and Non-Fungible Tokens (NFT), https://innovationlaw.jp/en/buyer-beware-digital-art-and-non-fungible-tokens-nft/.
"Benefits of NFTs and Data Privacy", Wirewheel, Jul. 26, 2021, https://wirewheel.io/blog/nfts-privacy/, 16 pages.
Tut, Kyle, "Who is Responsible for NFT Data?", Apr. 6, 2020, 7 pages, https://medium.com/pinata/who-is-responsible-for-nft-data-99fb4e8147e4.

(Continued)

*Primary Examiner* — William E. Baughman
(74) *Attorney, Agent, or Firm* — Fox Rothschild LLP (57) ABSTRACT

Disclosed herein are systems and methods for NFT data structure and related features and system. In some embodiment, a data structure is defined that is configured for storing certain defined elements on the blockchain ledger and other element on InterPlanetary File System or similar storage system. The other element is configured in accordance with the data structure to include a group of files. The element is a compressed archive of the group of files. The files are configured to provide the benefit of the usefulness or benefit of the product represented by the NFT and defined by the filed in the product archive. The data structure stores a pointer to the storage system and an identifier of the particular product on the blockchain. The system is configured to provide an expansion feature by way of the definition of a data structure that require minimal data storage such that storage on the block chain is light. The system can also provide a media archive that is contains convention media files and an image that is stored on the Internet on a publicly accessible server such as using a URL to quickly retrieve such related media.

12 Claims, 3 Drawing Sheets

Related U.S. Application Data filed on Dec. 30, 2021, provisional application No. 63/282,559, filed on Nov. 23, 2021.

(56) References Cited

U.S. PATENT DOCUMENTS

| | | | |
|---|---|---|---|
| 10,984,400 B1 | 4/2021 | Koch | |
| 11,044,098 B1* | 6/2021 | Thacker | H04L 9/3073 |
| 11,075,891 B1 | 7/2021 | Long et al. | |
| 11,138,580 B1 | 10/2021 | Koch | |
| 11,154,783 B1* | 10/2021 | Koch | A63F 13/49 |
| 11,367,060 B1* | 6/2022 | Barbashin | H04N 21/2743 |
| 2020/0005284 A1 | 1/2020 | Vijayan | |
| 2020/0242105 A1 | 7/2020 | Rich et al. | |
| 2020/0328890 A1 | 10/2020 | Connor | |
| 2020/0334752 A1 | 10/2020 | Doney et al. | |
| 2021/0035803 A1 | 2/2021 | Junhong et al. | |
| 2021/0067342 A1 | 3/2021 | Guinard et al. | |
| 2021/0133700 A1 | 5/2021 | Williams et al. | |
| 2021/0150626 A1 | 5/2021 | Robotham | |
| 2021/0248214 A1* | 8/2021 | Goldston | G06F 21/16 |
| 2021/0304196 A1 | 9/2021 | Patterson | |
| 2021/0358038 A1 | 11/2021 | Vandenberg et al. | |
| 2023/0042269 A1* | 2/2023 | Benedetto | A63F 13/73 |
| 2023/0079127 A1* | 3/2023 | Benedetto | A63F 13/355 |
| 2023/0138023 A1* | 5/2023 | Yang | A63F 13/86 |
| | | | 463/42 |
| 2023/0139878 A1* | 5/2023 | Clark | H04L 9/3297 |
| | | | 713/157 |

OTHER PUBLICATIONS

Gupta, Srajan, "Free decentralized storage and bandwidth for NFTs on IPFS and Filecoin", Medium, Sep. 8, 2021, 4 pages, https://medium.com/blockchain-vidhya/free-decentralized-storage-and-bandwidth-for-nfts-on-ipfs-and-filecoin-b7f3ecbb390c.

"Key infrastructure of the Metaverse: status, opportunities, and challenges of NFT data storage", by Blockchain Storage Research Center of HUST and HashKey Capital, 15 pages, https://www.hashkey.com/en/insights/key-infrastructure-of-the-metaverse-status-opportunities-and-challenges-of-nft-data-storage.html.

"The storage method of NFT artworks that you can't ignore", Fio, Oct. 25, 2021, 6 pages, https://www.fio.one/2021/10/25/the-storage-method-of-nft-artworks-that-you-cant-ignore/.

Seyed Mojtaba Hosseini Bamakan et al., "A Decentralized Framework for Patents and Intellectual Property as NFT in Blockchain Networks", Research Square, Oct. 5, 2021, 12 pages, https://assets.researchsquare.com/files/rs-951089/v1_covered.pdf?c=1633465371.

De la Rocha, "IPFS for storage, the blockchain for verified immutability," 8 pages, retrieved online:<https://metisdao.medium.com/ipfs-for-storagethe-blockchain-for-verified-immutability-50d03b88a071> (2021).

International Search Report and Written Opinion for International PCT Patent Application No. PCT/IB2022/061237, dated Feb. 28, 2023 (8 pages).

Saito and Schmidt, "Buyer Beware—Digital Art and Non-Fungible Tokens (NFT)," 8 pages, retrieved online: <https://innovationlaw.jp/en/buyer-bewaredigital-art-and-non-fungible-tokens-nft> (2021).

* cited by examiner

FIG. 5

NFT SYSTEMS, METHODS, AND STRUCTURES FOR MULTIPLATFORM GAMING CONTENT

FIELD OF THE INVENTION

The application is based on and claims priority to U.S. Provisional Patent Application No. 63/282,559, filed Nov. 23, 2021, U.S. Provisional Patent Application No. 63/266,247, filed Dec. 30, 2021, and U.S. Provisional Patent Application No. 63/399,092, filed Aug. 18, 2022, which are expressly incorporated herein by reference.

FIELD OF THE INVENTION

The present invention generally relates to the field of blockchain tokens and in some cases to nonfungible tokens, and related structures and systems.

BACKGROUND OF THE INVENTION

In recent times, NFTs (non-fungible tokens) have received significant attention and gained popular by way of many different NFTs and related systems being developed or provided to the public. An NFT itself usually has a few pieces of immutable information stored permanently, and the control/ownership of the NFT can be cryptographically secured and assured. Most often an NFT is minted for artwork but other subject matter is also used. Known data structures configured for NFTs and related or supporting system have various deficiencies or require improvement.

For example, an NFT data structure typically needs to address the issue of being able to trade NFTs without the intervention of the original creator/minter (e.g., trading on 3rd party platforms, or direct transactions). However, some structures suffer from trust issues because the minter also controls the asset source (e.g., the product represented by the NFT). In other solutions, while the NFT itself has immutable pieces of information, the issue is the asset source, if it is stored on a centralized webserver, the service may go down temporarily or permanently (e.g., the owner of the centralized webserver goes out of business), which will mean anyone owning the NFT will not be able to prove the NFT points to that specific piece of artwork, or be able to retrieve it. In other solutions, blockchains can store information on the blockchain, but since most blockchains are distributed ledgers, it would mean that all the ledgers will have a copy of the product (digital product of the NFT). This means the product could be duplicated millions of times, which is a waste of resources in terms of storage space and energy. The solutions can also have deficiencies in speed with respect to use of the product such as in particular in connection with gaming platforms.

There are many other advantages and problems being solved by the illustrative practical implementations provided herein.

SUMMARY OF THE INVENTION

Systems, methods, or computer readable medium are described, which in the present section for simplicity are referred to as methods. A method for storing and retrieving data in a computer memory for non-fungible tokens (NFT) is described comprising, configuring memory according to a data structure that defines the non-fungible token, the structure consisting essentially of: a unique identifier for the non-fungible token, a defined substructure that holds a group of gaming elements that together in accordance with the substructure define an operable gaming artifact accepted by adaptation in a plurality of gaming platforms a compressed file that encapsulates the group of elements in the accordance with the defined substructure in compressed format, a pointer that is a hash value of a hash of the compressed file and is generated when the compressed file is stored, as part of defining a particular non-fungible token, in a distributed multi-operator storage system that maintains a storage network that provides redundancy and distributed retrieval operators as a storage scheme, wherein the pointer is configured to retrieve and verify the compressed file from the distributed multi-operator storage system when the pointer is invoked.

The method can further include creating the data structure by generating a token in a blockchain network wherein the token consists essentially of the unique identifier and the pointer, adding the token to a block chain, and storing the compressed file in the distributed multi-operator storage system.

The distributed multi-operator storage system can be the InterPlanetary File System.

The defined substructure can be structured to include data elements associated gaming artifact that in combination when used recreate the gaming artifact to have its full functional behavior for reuse in a game.

The method can further include configuring the memory to store a media archive of the gaming artifact where in the media archive contains thumbnails, images, videos, or graphical content associated with the gaming artifact, wherein the media archive is stored on the Internet or in a system other than the distributed multi-operator storage system.

The method can further comprise storing media in the media archive in application readable format to allow the items to retrieved and displayed.

The media archive may not be compressed in the same way as the group of elements.

The method can further include implementing multiple gaming platforms comprising corresponding servers and retrieving a particular gaming artifact using the defined structure and pointer, and reading and adapting the gaming elements of that artifact from distributed multi-operator storage system to produce a functioning gaming artifact in the corresponding gaming platform.

The method can further comprise transferring ownership status of the non-fungible token to another owner in accordance with a blockchain process that records and maintains the block chain.

The blockchain can implement proof of work consensus protocol to maintain the accuracy of the data stored on the blockchain.

The method can further include defining substructure as an XML scheme created to hold the group of elements.

The method can further include storing a token on a blockchain that only contains the identifier and the pointer.

In some embodiments, an NFT structure is provided comprising an encrypted token configured to store an identifier and a pointer in an InterPlanetaroy File System that points to a file that is an archive of a compressed collection of files, wherein the pointer is a hash of the file and the collection of files collectively provide a non-fungible digital asset represented by the NFT.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun or phrase, such use is simply intended to distinguish one item from another and is not intended to require a sequential order unless specifically stated. The term "about" when used in connection with a numeric value, is intended to include values that are close to, but not exactly, the number. For example, in some embodiments, the term "about" may include values that are within +/−10 percent of the value.

As mentioned, the present application generally relates to nonfungible tokens and related technology. Those of ordinary skill in the art are generally familiar with NFTs, NFT systems, and implementations. An NFT itself usually has a few pieces of immutable information stored permanently, and the control/ownership of the NFT can be cryptographically secured and assured. Various known NFT data structures are used or are proposed and the structures address the issue of being able to trade NFTs without the intervention of the original creator or minter. Trading can, for example, refer to trading on $3^{rd}$ party platforms or direct transactions. In accordance with principles of the present invention, a method, system, (nontransitory) computer readable medium, or data structure are provided that incorporate and use a data structure defined to be made of (1) a unique identifier, (2) miscellaneous text information, (3) Pointer to a network file source (e.g., a server on the Internet, on the IPFS) for a first archive that is preferably a media archive that contains one or more primary media, such as thumbnails or previews, and (4) pointer to IPFS Source for a second archive that is preferably a product archive, that can include data structures, programming code, gameplay behaviour, video files, and other data. The product archive can contain a collection of files that provide the non-fungible asset (e.g., a gaming artifact such as a weapon) that is represented or controlled by the NFT. The terms first archive and media archive may be used interchangeably for convenience. The same applies for second archive and product archive.

The data structure (and related structures described herein) compresses the full behavior of the NFT asset, which might be very complex or simple, into a simple product archive that can be retrieved from IPFS and decoded by any user or computer that knows the schema of the archive, and recreate the full behavior of the NFT. For example, if the NFT is a video game character, it might include all the animation files of the character, the programmed behaviour of the character, 3D files etc that would be necessary to operably insert the character into another application or game.

Using the structure, a platform (e.g., one or servers and supporting software running on servers) is configured to keep a copy of the media archive (or perhaps even originating the media archive) in an uncompressed form and serves this data directly from the platform. Compression in this context refers to compression in which multiple distinct files are compressed into a single file which is typically in the zip or tar formats, and this is understood to include the class of such compression of applications. For example, JPEG may involve compression, but it is not compression for allowing the aggregation of distinct files into a compressed single file. This allows the platform to circumvent potential issues with IPFS caching performance or time delays involving accessing a particular file (on the fly) in a compressed group of files and meeting the expectations of its users.

The proposed embodiment of the product archive would preferably be a zip or tar archive with an XML, scheme describing the structure, various assets or elements stored in the product archive.

Existing NFTs in general provide very limited rights. The present system can provide a broader set of rights (ownership) of an asset with greater freedom to use it such as in other applications (such as in other gaming platforms). For example, the NFT can be a skin or special character in a video game. For the NFT to have functionality (e.g., usability) the NFT needs to include and support content or materials, but this adds a host of issues related to the authenticity, storage, and availability of the NFT. Storing the NFT content (images, preview, software code, etc.) on a central server (or central provider) has disadvantages such as if the server or provider is shut down for some reason, the content would be potentially lost. Storing the content (along with ownership data) on the block chain has advantages but also significant disadvantages because the size of the content and the many copies that would consequently be stored (to implement accessibility under a blockchain protocol) would result in a significant amount of storage (and over redundancy) which can have drawbacks such as the cost of storage (e.g., energy needed to maintain the blockchain).

The present system, as part of the implementation, stores NFTs under the defined data structure (described herein) including storage for the content (such as content source code) in IPFS. In more general, terms IPFS is a distributed multi-domain (multi operator) storage system that implements a protocol in which it automatically maintains back up or redundancy to allow accessibility (even if a node of the IPFS goes down). Other (similar) distributed file storage platforms that have a way of proving their contents match their identifier can be implemented. IPFS does this by generating a unique hash of the contents cryptographically, so it's not possible to call up a file with different contents using the same hash. The system can be implemented to offload the (media or product) archive (see or content more broadly in the NFT structure) to the distributed file system that does not allow modification of the archive associated with the unique identifier because of the association with the hash, such as in IPFS.

The platform uses encryption to control access to the content in the NFT structure (referring to media or product archive in the NFT structure). Content can be encrypted or encoded such that the content is tied to the ownership or identification information of the NFT.

The platform (or sometimes referred to as system) can be implemented to allow portability of game assets or artifacts to different gaming platforms (e.g., PS4 to Nintendo, or Call of Duty to Fortnite, etc.). The gaming software developer or system can implement conversation or adaptation to adapt content as needed to be useful when an NFT is ported by an NFT owner into a gaming platform for use. The NFT platform can facilitate with the process. The system can also allow for sale or transactions (using the blockchain on which the NFT is implemented).

It is beneficial to evaluate and solve problems in portability, centralized (versus decentralized), costs, and specific problems in the NFT's particular application (e.g., gaming objects) in relation to the system and/or data structure. Also, one of the objectives can be to provide full behavior to the corresponding nonfungible asset while providing the security and transactional benefits of tokens (blockchain ledgers). Many NFT implementations provide very limited set of rights (provide limited rights or behavior rights). An objective being solved is to be able to transact full ownership rights in the sense of the primary rights that an owner would typically benefit from as opposed to the limited rights that are often times currently associated with NFTs. As part of this, limiting the (digital) size and content of the NFT token implementation is important and thus, implementing a structure that is limited to a small data (but expanding) substructure is provided. For example, in some embodiments, the NFT structure implementation can comprise, consist essentially of (or consist of) (1) a unique identifier, (2) miscellaneous text information, (3) Pointer to a network file source (e.g., a server on the Internet, on the IPFS) for a first archive that is preferably a media archive that contains one or more primary media, such as thumbnails or previews, and (4) pointer to IPFS Source for a second archive that is preferably a product archive, that can include data structures, programming code, gameplay behaviour, video files, and other data. In some embodiments, the NFT data structure is without no. 3. The mentioned substructure of the product archive stored on the decentralized storage network can expand the NFT to provide full behavior or content of the NFT (e.g., when or because the structure of the substructure is known to the accessing system) and using a hash scheme to generate a pointer to the product archive in No. 4.

It should be understood that full behavior is one implementation and full does not necessarily mean every right but refers to the operability or usefulness (or set of defined rights and items) from owner/user's perspective. For example, being able to use, distribute, and display as would be expected by someone who is an owner of the asset of this type. Other implementations or ranges of rights are contemplated based on the embodiment.

For discussion purposes and pertinent to some embodiments, the application of gaming or gaming objects or characters as NFT is useful. The ownership and/or acquisition of NFT should preferably involve owning the full or substantially all rights to a gaming (e.g., video games on platforms such as PS5 or PCs) artifact (referring to such things as characters, objects, skins, or other in-game elements). The NFT (which would be inclusive of this artifact can be digitally portable such as being able to be operable or used on the same platform (e.g., from which it originated) or in other competitor platforms (e.g., Call of Duty on PS5 and Call of Duty on PC games). Embodiments of the present invention provide such features as described.

For example, NFTs can be minted for gaming artifacts in accordance with the structure (note that no. 3 may be optional). By way of cooperation, for example, video game platforms would agree to the structure of the NFT model or structure. When minted, the product archive is saved on a decentralized storage network such as IPFS. The product archive refers to the collection of content that represent the artifact and which makes it portable (ported) into the source or other video game platforms. The product archive can also include related content that is inherently or intimately related such as videos of game play of that character or different views of the object. The media archive (alternatively or in combination) can be configured to be a source of related videos, images, or graphical content (and can be separate or distinct because it is stored on a different platform, using a different storge protocol or accessibility, than the product archive). For example, the media archive may be accessible via an Internet link while the product archive (compressed file) is on IPFS or similar system that (functions similarly in material ways of how a file is stored and is accessed/retrieved as described herein).

The NFT is configured to implement a two-tiered data structure. The first structure being the token that is saved on the blockchain. The second data structure being the structure (which can be more complex and larger in size) defined for the product archive that is stored in the decentralized storage network (having redundant and distributed sources of the content). The second data structure can be defined or standardized by the overall system such as with respect to types or categories of artifacts. The second data structure can be variable such that the system or systems are configured through predefined information and interaction with the stored file on the decentralized network to comprehend the location of the (functional) elements in that data structure (e.g., such as to be able to successfully make an artifact available, e.g., through adaptation or porting by the destination gaming platform or NFT system, to the owner/user in a new destination platform).

A two-tiered data structure, as illustratively described herein, can provide greater efficiency and portability while reducing the size of data stored on the blockchain.

Preferably, the second data structure and/or the contents thereof are stored in compressed format involving a single file or one or more files on the decentralized storage network (the IPFS type network). This can reduce the size of data that is being stored in the decentralized network. Zip or tar can be used. A scheme such as an XML scheme describing the various assets can be stored in the second data structure. It is beneficial to have a single IPFS pointer in the NFT (structure D) to the IPFS for the second data structure (and therefore the product archive) but variations can be contemplated such as having two IPFS pointers for No. 4.

In some embodiments, it is contemplated that the after the product archive is stored on the IPFS or similar network and the pointer is generated using that file when it is stored (using a hashing function), one or more files in the product archive preferably are (or should be) updated or modified (e.g., as a result of game play for example reaching a higher tier). One of the advantages of the pointer is that it automatically verifies the archive retrieved with the pointer is the file that was stored when the NFT was created or minted. As such, in some embodiments, a central system or group of central systems (an NFT platform) can be implemented for potentially daily or more frequent interaction or update with the product archive. For example, an uncompressed product archive of an NFT can be saved in conjunction with the compressed product archive (as described). Since the gaming artifact may be played by its current user, the uncompressed version can be used by the system in updating, storing, or maintaining the development of the digital artifact (the gaming object in the present example) such as from game play, use, or purchases. In some embodiments, the pointer in the NFT remains the same after it is minted and in some embodiments, the system can be configured to update with a new pointer to the decentralized network that would then save a corresponding compressed version of the archive (including the updated developments). The uncompressed (not compressed product archive), e.g., for daily use, can be stored on the Internet (such as on a centralized server system) or other online storage system preferably separate (e.g., not redundant decentralized and/or using different type of pointer that does not involve a hash) from the product archive. Other pointers or storage arrangements are contemplated such as using a URL or centralized storage in some embodiments (or combinations of techniques).

The pointer can be to a file or location that is publicly available to others on the Internet without encryption or restriction. In other words, the files for the artifact can be stored without security or restriction such that if someone discovers the specific pointer, they can access and retrieve the content. The same can apply for the media archive. The NFT corresponding to the product archive (e.g., by way of identifiers) can be the key to be able to permit the artifact to be used in a game (e.g., using the keys associated for the NFT). Security can be applied to the file or files if desired but there are advantages to simply relying on the blockchain security and limiting access to the pointer while leaving the content (e.g., product archive) on the decentralized network unsecured.

The described structure or described variations are very light, and one objective is to limit the size of the content that is on the blockchain while also providing assurance to users to be able to have continuing access and portability of the content or product. E.g., if one gaming platform goes down, the decentralized storage network would still have the artifact for the user. The decentralized network is preferably configured to be able to maintain back up or redundant copies of a storage if a location or node fails, destroyed, removed, or goes down from operation. This assures long term liveliness. The decentralized network such as in IPFS can include or incorporate content-addressable hashes of data, which in IPFS are called Content-Identifiers (CIDS). CIDS or similar component in a centralized network generate a pointer and store the content such that the pointer is uniquely dependent on the content (e.g., file) that is stored (e.g., when the NFT is minted). As such, changes to the content would result in inconsistency with the pointer.

In some embodiments, the system can be configured to include a system that if desired automatically updates the media content (due to for example user playing with the character) on the decentralized network and also updates the pointer.

The NFT structure establishes the defined structure for all stake holders (and their system) and use in the NFT ecosystem. The NFT structure can work as a standard that promotes the growth, use, and adoption of the NFT as described such for gaming systems due to its technical advantage (which inherently includes the secure ledger of ownership transaction using the blockchain).

Figure 1:
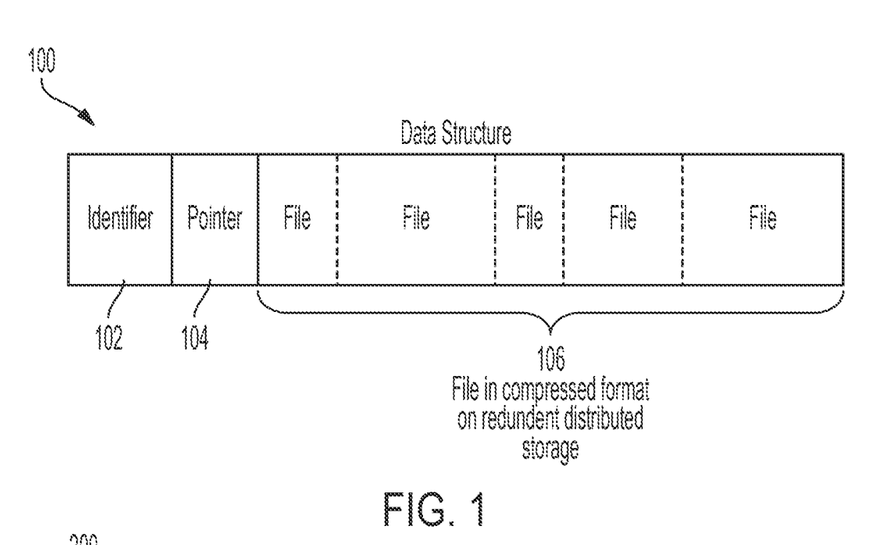
FIG. 1 is an illustration of a data structure in accordance with one or more embodiments of the present invention.

Now, in reference to FIG. 1, an illustrative data structure 100 is provided in accordance with principles of the present invention. The NFT structure 100 can comprise, consist essentially of (or consist of) (1) a unique identifier 102, (2) pointer 104 to IPFS source (or other redundant distributed decentralized storage network) that points for retrieval to a product archive (e.g., a single compressed files of a group of files), that can include a collection of data structures, programming code, gameplay behaviour, video files, and other data, and (3) a defined substructure 106 that is a data structure (such as an XML, scheme) that defines the data elements (a plurality of discrete functional items) of the product archive and by way of the data structure definition establishes corresponding functionality, data type, location, size, format, relationships, and/or role of the files in the product archive in relation to the platform (e.g., gaming platform) that the product representing by the NFT and product archive is used or enjoyed by its corresponding user. The defined substructure of no. 3 can be shared with gaming platforms or other platforms to make the addition or use in the platforms automated (e.g., similar to when packets are defined to hold different sets of information using a data structure of packet definition). If desired, such a map of features can be included in the media archive for retrieval when the archive is decompressed and used. Variations are contemplated. The mentioned substructure of the product archive stored on the decentralized storage network can expand the NFT to provide full behaviour and/or content of the NFT (e.g., when or because the structure of the substructure is known to the accessing system) and using a hash scheme to generate a pointer to the product archive in No. 3 (e.g., in the IPFS). The files of the product archive are stored on the storage network or system and preferably on redundant distributed decentralized storage system such as IPFS. The system can implement a protocol across nodes on the network of nodes in the storage system that implements operations for storage files and retrieval of files in accordance with meeting redundancy, liveness, decentralization, and distribution.

As is disclosed, embodiments of the present invention can include various different combinations of described elements or features. The NFT would include the files of the product archive, which files are not stored on the blockchain ledger on which the NFT is minted, implemented, for maintained for functional use such as recording transactions involving the minted NFT such as changes in ownership.

The NFT aspect stored on the blockchain is the identifier 102 and pointer 104. The NFT's compressed files are stored on the IPFS for example and the files in the media archive are stored in accordance with data structure 106.

Figure 2:
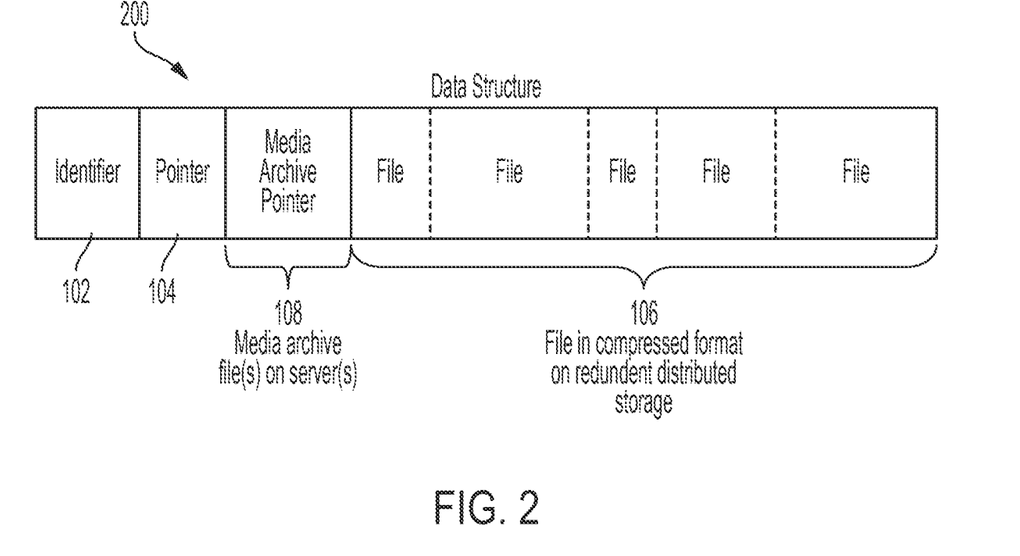
FIG. 2 is an illustration of a data structure in accordance with one or more embodiments of the present invention.

Now, in reference to FIG. 2, an illustrative data structure 200 is provided in accordance with principles of the present invention. The data structure is the same as data structure 100 of FIG. 1 with the addition that the data structure 200 includes a data structure that includes a pointer to media (e.g., thumbnail) or media archive (e.g., thumbnail and gameplay videos).

It is understood from the above description that the functionality and features of the systems, devices, or methods of embodiments of the present invention include generating and sending signals to accomplish the actions. The NFT structure 200 can comprise, consist essentially of (or consist of) (1) a unique identifier 102, (2) pointer 104 to IPFS source (or other redundant distributed decentralized storage network) that points for retrieval to a product archive (e.g., a single compressed files of a group of files), that can include a collection of data structures, programming code, gameplay behaviour, video files, and other data, (3) a defined substructure 106 that is a data structure (such as an XML, scheme) that defines the data elements (a plurality of discrete functional items) of the product archive and by way of the data structure definition establishes corresponding functionality, data type, location, size, format, relationships, and/or role of the files in the product archive in relation to the platform (e.g., gaming platform) that the product representing by the NFT and product archive is used or enjoyed by its corresponding user, and (4) pointer 108 to a media file or archive. The pointer can preferably be a URL on the Internet. The pointer can if desired be an IPFS pointer. The pointer can be a plurality of pointers or can be a single pointer that point to a location of media files such as a thumbnail, images, videos, or graphic content. As mentioned above, the media archive files are preferably stored on a network for retrieval without being compressed into an archive such as in the same way as the product archive. The media files can be in a configuration and format that they can be retrieved and played without requiring file decompression (as opposed to other types of compression that are inherent to a file type of applications such as image files such JPEG). The pointer 108 is preferrable part of the data values that are stored on the blockchain ledger with the pointer 104 and identifier 102.

Identifier 102 is preferrable a unique identifier with the NFT set minted in accordance with the structure. Identifier 102 is a unique identifier within that set and can include numbers or other identifiers for defining the value of the identifier. It is contemplated that identifier 102 can be unique by way of a combination of information or process that operate on the identifier 102 to determine the unique identity of that particular token.

The file or record that is stored on the blockchain ledger for the NFT can include other data or data fields (values for data values) that are implemented or used by the blockchain ledger protocol of the blockchain on which it is recorded (meaning in addition to mentioned pointers and identifier).

Figure 3:
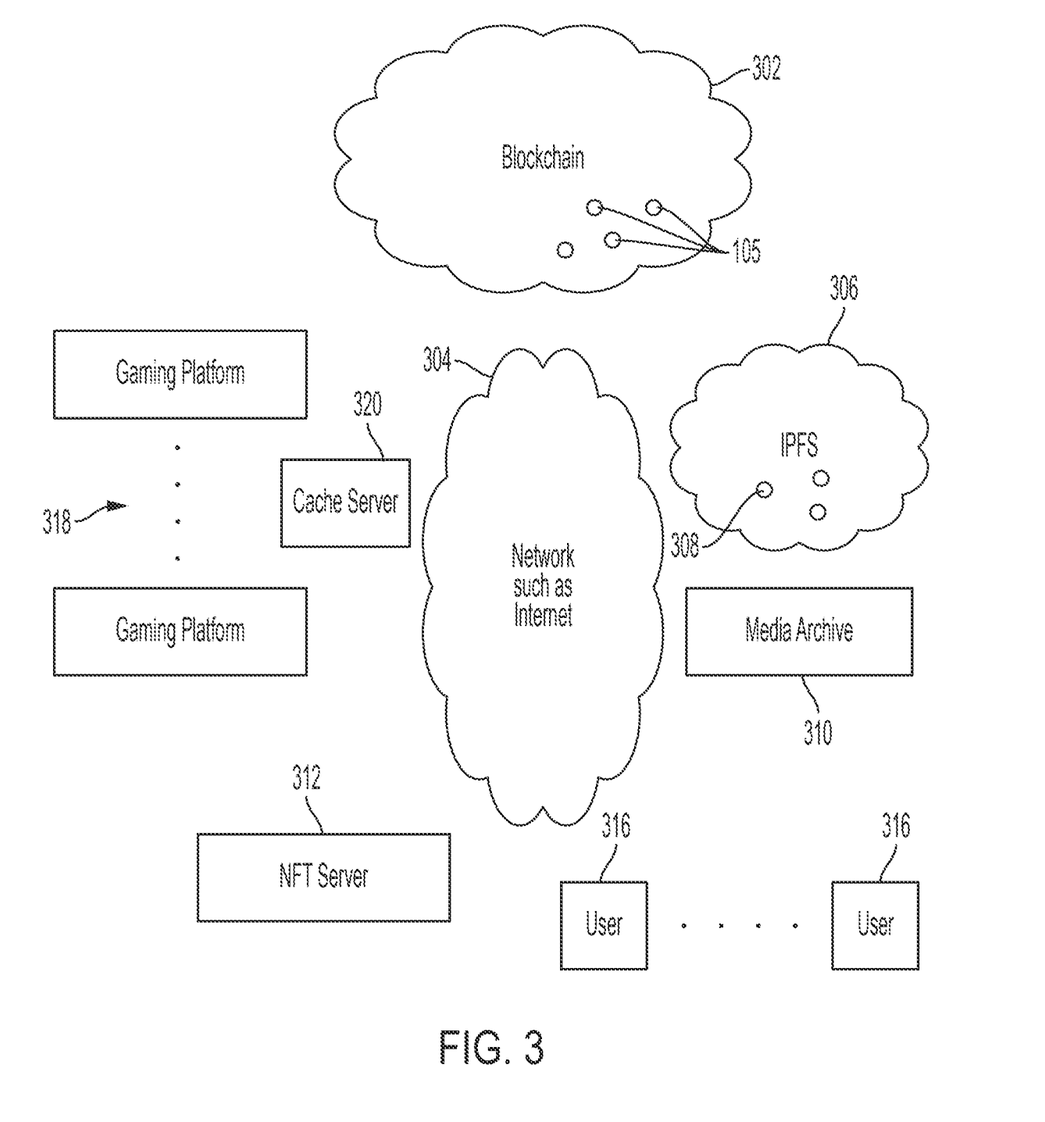
FIG. 3 is an illustration of system that uses NFT in accordance with one or more embodiments of the present invention.

FIG. 3 describes a system 300 involving functional block elements that depict a technological ecosystem that creates, maintains, uses, transfers, and stores NFTs in accordance with the descriptions provided herein and understood to be contemplated. The system 300 blockchain system 302 that includes a plurality of node computers 105 and a communications network connecting the plurality of node computers 105. Each node computer in the plurality includes a processor, memory storing computer instructions executable by the processor, and a network interface operatively coupled to the processor and the communications network which may be a wide area network such as the Internet. The blockchain system 302 is implemented with a blockchain consensus software application (blockchain consensus protocol). The blockchain consensus software application is adapted to connect to the plurality of node computers 105 through the communications network. The blockchain consensus software application configures the blockchain system 302 to operate using the data structures and related features illustratively described in this application. Communication between node computers 105 are by way of digital messages constructed by the node and transmitted to other node computers using packets over a communications network.

Through the software application, node computers 105 can operate to reach a consensus on adding transactions (such as the transfer or changes in data fields or information related to ownership) to an overall transaction record maintained by the blockchain system and have an agreement on what the overall transaction record is. Each node 105 in the blockchain system 302 may be referred to as a consensus node. The transactions may be NFT transactions such as recordation of the transfer from one user to another user (based on user identifier information such as cryptographic wallet information). The overall transaction record is where all the transactions processed through the blockchain system 302 is stored. The overall transaction record is kept in the form of a blockchain. Node computers 105 in the blockchain system each has its own copy of the overall transaction record or blockchain. A node computer might have a different copy of the overall blockchain temporarily, but node computers will eventually agree on a same overall blockchain. The blockchain means a distributed ledger in which transactions are maintained across several node computers that are linked and immutable in a peer-to-peer network. Maintain means that each node computer has a local copy of the blockchain or transactions processed through the blockchain system and can update its local copy when new transactions or proposals are received in the blockchain system 302. It would be understood that examples of blockchain such as for storing or maintain NFT includes Ethereum, Solana, and Cardano.

A block refers to a block on a blockchain or a block to be added onto a blockchain so that it extends from the latest block from a blockchain. A block may include transactions, hash of the previous electronic block, hash of the current electronic block, a timestamp, Merkle root, target, nonce, and other information, or one or more of the aforementioned information.

Network 304 is a wide area network and is preferably the Internet. Network 304 comprises a plurality of computers including networking equipment for implementing communications and traversal of message or packets between computer and applications. Computer nodes that implement network 304 include or overlap with the other computers or devices mentioned herein such as user devices (e.g., mobile phones).

IPFS 306 can be the InterPlanetary File System or other storage system having features of being configured to be store files on nodes 308 that in accordance with system implemented protocols or roles implement decentralization and redundancy. As explained on ipfs.io, when you add a file to IPFS, IPFS is configured such that the file is split into smaller chunks, cryptographically hashed, and given a unique fingerprint called a content identifier (CID). This CID acts as a permanent record of your file as it exists at that point in time. In configuration, when other IPFS nodes look up your file, they ask their peer nodes who's storing the content referenced by the file's CID. Further in the configuration of the IPFS, when they view or download your file, they cache a copy and become another provider of your content until their cache is cleared. A node can pin content in order to keep (and provide) it forever (e.g., without a set time limit), or discard content it hasn't used in a while (based on some criteria) to save space. This means in IPFS and similarly implemented storage systems each node in the network stores only content it is interested in, plus some indexing information that helps figure out which node is storing what. In the implementation of IPFS, it is configured such that if you add a new version of your file to IPFS, its cryptographic hash is different, and so it gets a new CID. This means files stored on IPFS are resistant to tampering and censorship any changes to a file don't overwrite the original, and common chunks across files can be reused in order to minimize storage costs. However, this configuration doesn't mean you need to remember a long string of CIDs. IPFS is configured such that it can find the latest version of your file using the IPFS decentralized naming system, and DNS Link can be used to map CIDs to human-readable DNS names. As discussed, IPFS 306 or similarly implemented system can be the source and storage for the product archive. IPFS can also involve multiple operators of nodes in the IPFS such that it is not a private network and is open to public access such as via the Internet.

IPFS (InterPlanetary File System) decentralizes storage and retrieves files from IPFS nodes based on a unique hash of the file. Some large IPFS participants are services such as Cloudflare. IPFS works essentially the same way as torrents, but with much faster response time for the purpose of building a decentralized web.

As discussed, media archive may store thumbnails or other media. Media archive 310 can be implemented and include one or more servers and can involve a pointer to different domains such as different URL domains to provide the mentioned functionality. Media archive 310 can preferably be on or accessible from network 304.

NFT server 312 is a computer that is configured to create or mint NFTs in accordance with embodiment of the present invention. NFT server 312 can create NFTs in accordance with the data structures of FIG. 1., FIG. 2, as otherwise described or understood from the present description. The NFT can be tracked or maintain on blockchain 302 by adding or storing, as described, certain aspects of the data structure on the blockchain 302 (e.g., pointer 104). NFT server 312 can also be configured to implement related supporting or operation functionality such as purchase or transfer transactions of the created NFTs Users 316 represented client end devices that interact with the system 300 for various functional purposes such as purchasing an NFT or using an NFT in a gaming platform Users 316 are computers such as gaming consoles, personal computers, mobile devices such as cellular phones, or other client devices on which user application are configured to operation to provide the use or advantages of the NFT or product represented by the NFT.

Gaming platforms 318 provide different video games in accordance with different gaming consoles (e.g., Sony, Microsoft, Nintendo, etc.) or gaming portal or publisher (e.g., Steam or Activision). Gaming platforms 318 are configured to include digital gaming artifacts such a weapon, skin, character, level, map, or other gaming artifact. In implementations focused on gaming, a digital gaming artifact is the product that is represented (or controlled) by the NFT created in accordance with the data structure and features illustratively described herein. The product archive is configured to include functional files that at least provide portability involving addition to a gaming platform 318 or moving the artifact from one gaming platform 318 to another gaming platform 318. If desired, each gaming platform can be configured to use the data structure and data substructure to retrieve and add the files of the digital artifact to that gaming platform so that user or owner of that artifact can now have access to and use that artifact in a game available on that gaming platform 318. The process may involve adaptation or transformation of the content of the files to be operable or operably functional for suitable player use on the game or platform that the artifact is added into.

Cache server 320 can be implemented and configured to provide an associated electronic resource for the use (e.g., use in gaming application) of the asset represented by the NFT such as frequent use daily. Cache server 320 is configured with hardware and software to provide a resource that retrieves the NFT data files from locations other than IPFS (IPFS pointer) and if not available other locations, can use the IPFS pointer to retrieve the NFT files. The term retrieval is being for clarity. It should be understood that it can include processes that individually or together involve provide providing or receiving the data files to the application or computer that is requesting the NFT (invoking to use the NFT in a game or participating in a game with coplayers where another player is using an NFT). As discussed below, in some embodiments, the data structure may include a point which can be URL or some other kind of electronic address, link, or connection to a cache service provided as an additional resource to speed the file retrieval process. As opposed to, for example, retrieving process for files in a compressed file on IPFS (or similar resource).

Cache server 320 can be configured to be store information identifying the location of recent files or identifying location of files in locations other than the IPFS (or similar type of resource). This knowledge of file locations saved or available to the cache server 320 can increase the speed at which the files are retrieved or made available. This provides a "fetching" type resource where the requestor can use the cache server 320 as a resource or cloud service that can supplement the features of the NFT data structure and related system to make files more readily and quickly available because the cache server would be configured to know the NFT files and maintain a system for saving the location of files (in uncompressed form) on the Internet, a local drive of the cache server, or wherever available to the cache server via digital communications. This can contemplate some level of updates or variation in files such that for example some portion of progress in game play can be tracked or stored on the files. For example, the IPFS compressed files may store the NFT files and the files accessed or updatable by the cache server 320 can include some or all of those that are stored without change (copies of the NFT files) and there can be some files that are stored that may change or be new that for example can be used for updating the NFT in the future.

In some embodiments, the cache server 320 at some initial point retrieves the files from the NFT data structure for a particular NFT (e.g., from IPFS) and then uses that as the source for future usage or retrieval.

In some embodiments, the cache server 320 may be configured to know the structure and type of files included in a particular type of NFT data structure. This can involve programming the server. The knowledge can be obtained by the sever 320 by for example being programmed to read a file such as configuration file in the data structures (e.g., using an extension or identifier for configuration files) that can signal to the cache that the contents provides information or indication of files, file type, file structure, parameters for use, file size, or other configuration information that makes the files operable in an application (e.g., gaming application) to make the NFT useable by the owner or others working with the owner.

Figure 4:
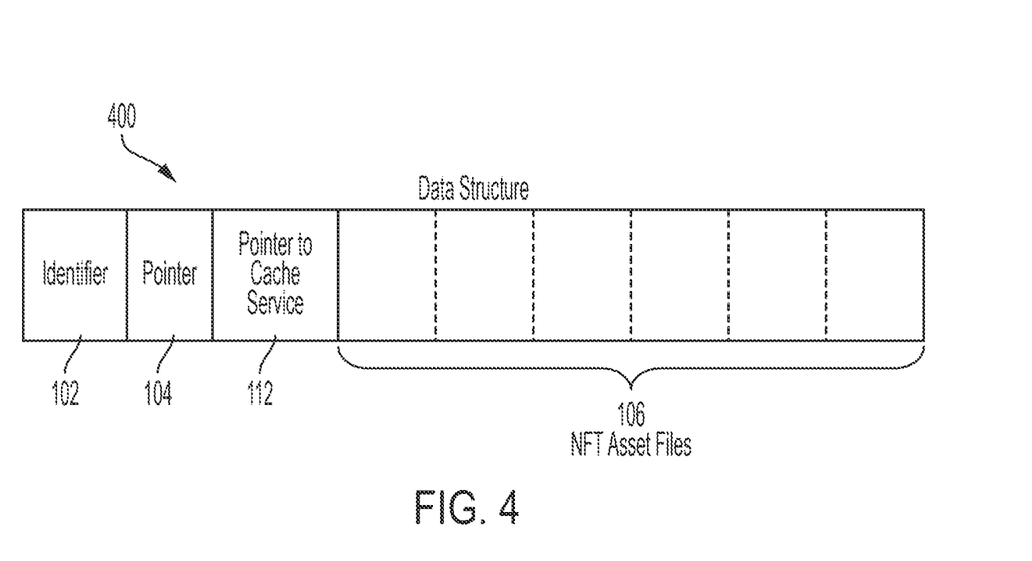
FIG. 4 is an illustration of a data structure in accordance with one or more embodiments of the present invention.

Now, in reference to FIG. 4, an illustrative data structure 400 is provided in accordance with principles of the present invention. The data structure is the same as data structure 100 of FIG. 1 with the addition that the data structure 400 includes a data structure that includes a pointer to the cache service such as cache sever 320.

It is understood from the above description that the functionality and features of the systems, devices, or methods of embodiments of the present invention include generating and sending signals to accomplish the actions. The NFT structure 400 can comprise, consist essentially of (or consist of) (1) a unique identifier 102, (2) pointer 104 to IPFS source (or other redundant distributed decentralized storage network) that points for retrieval to a product archive (e.g., a single compressed files of a group of files), that can include a collection of data structures, programming code, gameplay behaviour, video files, and other data, (3) a defined substructure 106 that is a data structure (such as an XML, scheme) that defines the data elements (a plurality of discrete functional items) of the product archive and by way of the data structure definition establishes corresponding functionality, data type, location, size, format, relationships, and/or role of the files in the product archive in relation to the platform (e.g., gaming platform) that the product representing by the NFT and product archive is used or enjoyed by its corresponding user, and (4) pointer 112 to the cache service (that provides access to the contents of substructure 106 (see above discussion in connection with cache server 320). The pointer can be a URL on the Internet or other type of software mechanism point to the resource. The pointer can be a plurality of pointers or can be a single pointer that points to a location of files in the data structure. As mentioned above, the cache service provides a convenient mechanism for quickly access or using NFT assets and/or asset contents such as when player wants to sue an NFT in game. The pointer 112 is preferably part of the data values that are stored on the blockchain ledger with the pointer 104 and identifier 102.

Identifier 102 is preferrable a unique identifier withing the NFT minted in accordance with the structure. Identifier 102 is a unique identifier within that set and can include numbers or other identifiers for defining the value of the identifier. It is contemplated that identifier 102 can be unique by way of a combination of information or process that operate on the identifier 102 to determine the unique identity of that particular token.

The file or record that is stored on the blockchain ledger for the NFT can include other data or data fields (values for data values) that are implemented or used by the blockchain ledger protocol of the blockchain on which it is recorded (meaning in addition to mentioned pointers and identifier).

Figure 5:
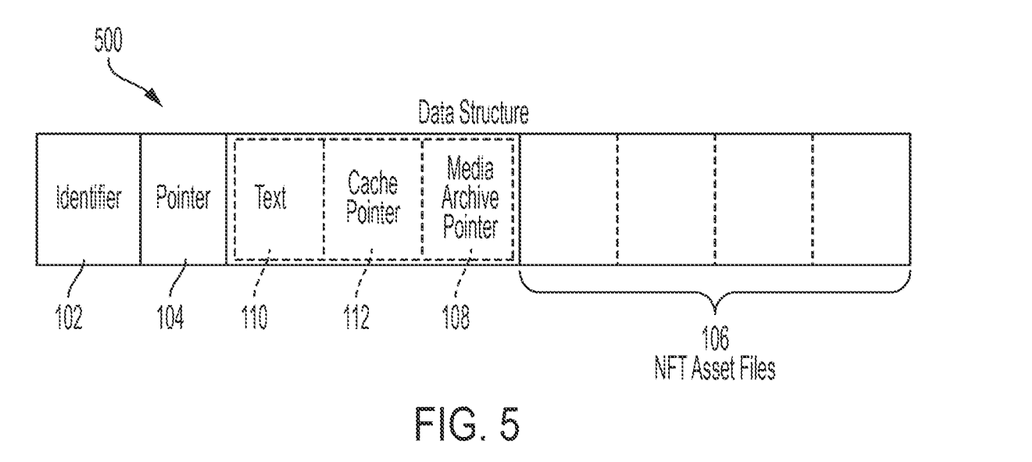
FIG. 5 is an illustration of a data structure in accordance with one or more embodiments of the present invention.

Now, in reference to FIG. 5, an illustrative data structure 500 is provided in accordance with principles of the present invention. FIG. 5 is provided to illustrate that in some embodiment, the data structure can include in addition miscellaneous text 112 (e.g., such as a description of an artifact such as a Level 5 Titanium Axe). It also illustrates that one, some, all of text 110, cache pointer 112, and media archive pointer 108 can be defined to be in an embodiment of the data structure. The data structure is the same as data structure 100 of FIG. 1 with the noted changes in data structure 500.

It is understood from the above description that the functionality and features of the systems, devices, or methods of embodiments of the present invention include generating and sending signals to accomplish the actions. The NFT structure 500 can comprise, consist essentially of (or consist of) (1) a unique identifier 102, (2) pointer 104 to IPFS source (or other redundant distributed decentralized storage network) that points for retrieval to a product archive (e.g., a single compressed files of a group of files), that can include a collection of data structures, programming code, gameplay behaviour, video files, and other data, (3) a defined substructure 106 that is a data structure (such as an XML, scheme) that defines the data elements (a plurality of discrete functional items) of the product archive and by way of the data structure definition establishes corresponding functionality, data type, location, size, format, relationships, and/or role of the files in the product archive in relation to the platform (e.g., gaming platform) that the product representing by the NFT and product archive is used or enjoyed by its corresponding user, and (4) one or more of text 110, pointer 112, and media archive pointer 108. It would be understood that FIGS. 2 and 4 illustrate the data structure with cache service pointer 112 or media archive pointer 108.

The file or record that is stored on the blockchain ledger for the NFT can include other data or data fields (values for data values) that are implemented or used by the blockchain ledger protocol of the blockchain on which it is recorded (meaning in addition to mentioned pointers and identifier).

An objective of the data structure is to define the NFT or similar token. Files, data fields, parameters, or data used or directed to the operational aspect or working of a block chain or block chain ledger (e.g., the hash of transactions) are not directed to the objective. Similarly, Files, data fields, parameters, or data used or directed to the operational aspect or working of networks or network communication protocols are not directed to the objective. As such data would be outside of the scope of the consisting essentially language described herein. To the extent, there are other types of such data they would be treated the same.

In some embodiments, the simple structure of a pointer and IPFS pointer to a compressed file itself provides a significant advantage in simplicity in operation and low data overhead. The data structure can include this and other data structure element. Meaning the data structure comprising the identifier and IPFS pointer (or pointer to a similar data storage). This by itself can be significant improvement. As such, it can have other features such as other pointers or portions of the NFT asset files in the blockchain portion of the data structure.

Protocols, algorithms, or functionality described in this application are implemented on computers (e.g., node computers) that are connected by a communications network. The communications network can include the Internet, a cellular network, a telephone network, a computer network, a packet switching network, a wide area network (WAN), a global area network, or other network. Embodiments of the present invention are directed to systems, devices, and methods that perform the protocols and algorithms. Embodiments of the present invention are also related to a non-transient computer readable medium configured to carry out any one of the methods disclosed herein. The protocols, algorithms, or features can be a set of computer instructions readable by a processor and stored on the non-transient computer readable medium. Such medium may be permanent or semi-permanent memory such as hard drive, floppy drive, optical disk, flash memory, ROM, EPROM, EEPROM, etc., as would be known to those of ordinary skill in the art. Block or blockchain information may be stored on the non-transient computer readable medium or the memory. Memory, for example, may be cache memory, semi-permanent memory such as RAM, and/or one or more types of memory used for temporarily storing data.

Processor may include an application specific integrated circuit (ASIC), programmable logic array (PLA), digital signal processor (DSP), field programmable gate array (FPGA), or any other integrated circuit. Processor can also include one or more of any other applicable processors, such as a system-on-a-chip that combines one or more of a CPU, an application processor, and memory, or a reduced instruction set computing (RISC) processor.

It is understood that embodiments of the present invention are computer-implemented systems or processes.

Exemplary systems, devices, and methods are described for illustrative purposes. Further, since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention.

Thus, for example, any sequence(s) and/or temporal order of steps of various processes or methods (or sequence of device connections or operation) that are described herein are illustrative and should not necessarily be interpreted as being restrictive. Accordingly, it should be understood that although steps of various processes or methods or connections or sequence of operations may be shown and described as being in a sequence or temporal order, but they are not necessarily limited to being carried out in any particular sequence or order. Moreover, in some discussions, it would be evident to those of ordinary skill in the art that a subsequent action, process, or feature is in response to an earlier action, process, or feature (even though not explicitly stated).

It is also implicit and understood that the applications or systems illustratively described herein provide computer-implemented functionality that automatically performs a process or process steps unless the description explicitly describes user intervention or manual operation.

It is also implicit and understood that the applications or systems illustratively described herein include a computer includes non-transitory or non-volatile computer readable memory that stores computer readable instructions that when executed by a computer perform processes, steps, or operations that are described herein (implicitly or explicitly).

In some implementations, a data storage and retrieval system is contemplated and described that creates, stores, and/or configures NFT in accordance with the NFT structure illustratively described herein.

In some respects, features described herein can be contemplated to be implemented for fungible tokens.

It should be understood that claims that include fewer limitations, broader claims, such as claims without requiring a certain feature or process step in the appended claim or in the specification, clarifications to the claim elements, different combinations, and alternative implementations based on the specification, or different uses, are also contemplated by the embodiments of the present invention.

It should be understood that combinations of described features or steps are contemplated even if they are not described directly together or not in the same context.

The terms or words that are used herein are directed to those of ordinary skill in the art in this field of technology and the meaning of those terms or words will be understood from terminology used in that field or can be reasonably interpreted based on the plain English meaning of the words in conjunction with knowledge in this field of technology. This includes an understanding of implicit features that for example may involve multiple possibilities, but to a person of ordinary skill in the art a reasonable or primary understanding or meaning is understood.

What is claimed is one or more system, method, or computer readable medium that comprises one or more features (e.g., combination of features) described herein, that can include generic claim elements based on species or embodiments described or understood from the present description.

It should be understood that combinations of described features or steps are contemplated even if they are not described directly together or not in the same context.

Exemplary systems, devices, and methods are described for illustrative purposes. Further, since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention. Applications of the technology to other fields are also contemplated.

The invention claimed is:

1. A method for storing and retrieving data in a computer memory for non-fungible tokens, comprising:
configuring memory according to a data structure that defines the non-fungible token, the structure consisting essentially of:
a unique identifier for the non-fungible token,
a defined substructure that holds a group of gaming elements that together in accordance with the substructure define an operable gaming artifact accepted by adaptation in a plurality of gaming platforms
a compressed file that encapsulates the group of elements in the accordance with the defined substructure in compressed format,
a pointer that is a hash value of a hash of the compressed file and is generated when the compressed file is stored, as part of defining a particular non-fungible token, in a distributed multi-operator storage system that maintains a storage network that provides redundancy and
distributed retrieval operators as a storage scheme, wherein the pointer is configured to retrieve and verify the compressed file from the distributed multi-operator storage system when the pointer is invoked.

2. The method of claim 1 further comprising creating the data structure by generating a token in a blockchain network wherein the token consists essentially of the unique identifier and the pointer, adding the token to a block chain, and storing the compressed file in the distributed multi-operator storage system.

3. The method of claim 1 wherein the distributed multi-operator storage system is the InterPlanetary File System.

4. The method of claim 1 wherein the defined substructure is structured to include data elements associated gaming artifact that in combination when used recreate the gaming artifact to have its full functional behavior for reuse in a game.

5. The method of claim 1 further comprising configuring the memory to store a media archive of the gaming artifact where in the media archive contains thumbnails, images, videos, or graphical content associated with the gaming artifact, wherein the media archive is stored on the Internet or in a system other than the distributed multi-operator storage system.

6. The method of claim 5 further comprising storing media in the media archive in application readable format to allow the items to retrieved and displayed.

7. The method of claim 6 wherein the media archive is not compressed in the same way as the group of elements.

8. The method of claim 1 further comprising implementing multiple gaming platforms comprising corresponding servers and retrieving a particular gaming artifact using the defined structure and pointer, and reading and adapting the gaming elements of that artifact from distributed multi-operator storage system to produce a functioning gaming artifact in the corresponding gaming platform.

9. The method of claim 1 further comprising transferring ownership status of the non-fungible token to another owner in accordance with a blockchain process that records and maintains the block chain.

10. The method of claim 7 wherein the blockchain implements proof of work to maintain the accuracy of the data stored on the blockchain.

11. The method of claim 1 wherein the defined substructure is an XML scheme created to hold the group of elements.

12. The method of claim 1 further comprising storing a token on a blockchain that only contains the identifier and the pointer.

* * * * *